United States Patent Office 3,184,404
Patented May 18, 1965

3,184,404
HYDROCRACKING OF HYDROCARBONS WITH A CATALYST COMPOSITE COMPRISING A TUNGSTEN COMPOUND AND A METAL COMPOUND FROM GROUP VIII ON AN ACTIVATED ALUMINA SUPPORT
Richard A. Flinn, Emmaus, Bruce K. Schmid, McCandless Township, Allegheny County, and Meredith M. Stewart, Penn Hills Township, Allegheny County, Pa., assignors to Gulf Research & Development Company, Pittsburgh, Pa., a corporation of Delaware
No Drawing. Filed Apr. 25, 1962, Ser. No. 189,985
8 Claims. (Cl. 208—112)

This invention relates to improvements in hydrocracking procedure and particularly to a hydrocracking process which results in high conversion.

It is well known that various hydrocarbon fractions boiling above about 300° F. can be converted into lower boiling hydrocarbons by procedure known as hydrocracking. This procedure involves contacting the hydrocarbon with hydrogen at hydrocracking temperatures and pressures in the presence of a two-component catalyst, i.e. one component having hydrogenation activity and the other component having cracking activity. Hydrogenating components may comprise nickel, nickel sulfide, platinum, palladium, etc. The cracking component is usually a silica-alumina cracking catalyst and usually constitutes the carrier for the hydrogenating component. Although this prior art procedure gives reasonably high yields, there is still room for improvement in this regard.

This invention has for its object to provide improved hydrocracking procedure. Another object is to provide hydrocracking procedure which enables high conversion into lower boiling materials. Another object is to improve the state of the art. Other objects will appear hereinafter.

These and other objects are accomplished by our invention which includes hydrocracking of a hydrocarbon feed stock which boils above about 300° F. and which is substantially free of asphaltic material by contacting this hydrocarbon feed stock with hydrogen under hydrocracking reaction conditions in the presence of a two-component catalyst. The hydrogenating component of this catalyst comprises tungsten oxide or sulfide mixed with a member of the group consisting of nickel, nickel oxide, nickel sulfide, palladium and palladium sulfide. The support for the hydrogenating component is an activated alumina prepared by drying and calcining a substance which is predominantly composed of an aluminum hydroxide containing from 1.2 to 2.6 mols of water of hydration which aluminum hydroxide is prepared by precipitation from a solution of an aluminum salt at a pH between 7 and 12.

As indicated, the activated alumina carrier or support employed in our invention is obtained by drying and calcining material predominantly composed of aluminum hydroxide containing from 1.2 to 2.6 mols of water of hydration. Any aluminum salt may be employed in preparing this aluminum hydroxide containing 1.2 to 2.6 mols of water of hydration. For instance aluminum nitrate, chloride, acetate, formate, fluoride, sulfate, and other salts of aluminum may be used. Also a variety of bases such as sodium hydroxide, ammonium hydroxide, potassium hydroxide, etc. may be employed to precipitate the aluminum hydroxide. However we prefer to employ salts of aluminum and bases which do not give reaction by-products or salts which are difficult to separate from the desired aluminum hydroxide. For instance, if aluminum sulfate and/or sodium hydroxide are employed or even if aluminum sulfate and ammonium hydroxide are employed, sulfate salts are formed which are difficult to remove by water washing and usually require prolonged water washing for complete removal. On the other hand, if aluminum nitrate, aluminum chloride or an aluminum salt of an organic acid is used and a base such as ammonium hydroxide is employed, the salts which are formed are readily soluble in water and can be easily removed by water washing of the aluminum hydroxide. Such removal may also be accomplished by volatilization during subsequent calcining. For the above reasons potassium and sodium hydroxide are considered to be of little value as compared with aqueous ammonia. Regardless of the specific aluminum salt and base that are used, the alumina final product should be substantially free of such salts. Because of ease in removing salts we prefer to use aluminum nitrate or chloride and neutralize with ammonium hydroxide.

The utilization of a pH between 7 and 12 is essential in order to obtain the improved alumina carrier utilized in our invention. In other words, the use of a pH above or below this range results in formation of large amounts of undesirable aluminum hydroxides containing higher and/or lower quantities of water of hydration than 1.2 to 2.6 mols per mol of $Al_2O_3$. Also, care must be employed at all times during the neutralization to avoid a localized higher or lower pH. If a local pH above or below this value exists at any time, a less satisfactory form of aluminum hydroxide having a different water of hydration content will be formed in this local region. This less satisfactory form will dilute the desired form and will reduce its value to a degree greater than to be expected from the amount which is present. For this reason, it is desirable to utilize a basic solution having the desired pH between 7 and 12 and to add the aluminum salt in small amounts, preferably an aqueous solution thereof, to the basic solution with rapid agitation. If this expedient is used, the resultant aluminum hydroxide is unlikely to be precipitated even in local regions at a pH below 7 or greater than 12. This procedure, of course, need not be used. For instance, slow addition of either reactant to the other with sufficient agitation to prevent local pH values outside the desired range can be used. A pH of 7–8.5 is advantageous since in many cases it gives a higher yield and a more active product. Stoichiometric amounts of the aluminum salt and base are advantageously used. We also prefer to use solutions of both base and aluminum salt which are either dilute or of moderate concentration, such as between about one and 20 percent aluminum salt and between about one and 20 percent of basic solution. However, higher or lower concentrations can be used. The aluminum hydroxide thus formed is separated from the aqueous mixture by filtration, centrifuging, decanting, or any other suitable method. Washing to remove salts as described above is advantageous and is necessary if the salt is not readily volatilized during the subsequent calcination.

This separated aluminum hydroxide still contains entrained, adherent or mechanically held water, and it must be dried to remove this water before a stable product is obtained. Even though the desired form of aluminum hydroxide is initially prepared, it is unstable and may undergo transformation during the process of precipitation, separation and/or drying and it is necessary to observe certain precautions to avoid this harmful transformation. Therefore, before giving details on the drying and calcining procedure, it would be best to consider procedures which may be employed to avoid this harmful transformation, particularly during the process of neutralization and precipitation.

One method for avoiding this harmful transformation is to use elevated temperatures such as above about 170° F. These elevated temperatures reduce or prevent the undesirable transformation of the aluminum hydroxide into one having a lower or higher water of hydration content. However, for these temperatures to have these beneficial effects, they should be maintained throughout the above mentioned precipitation and washing steps and until the drying is completed. Higher temperatures such as 200° F. to 300° F. or even higher may be used. This specific mode of preparing aluminum hydroxide of 1.2 to 2.6 mols of water of hydration content is the subject of U.S. application Ser. No. 118,240, filed June 20, 1961, in the names of W. L. Kehl and M. M. Stewart.

According to another method of avoiding the transformation into less desirable forms the precipitation and drying are carried out with promptness. Thus the time required for the transformation to take place is such that the entire precipitating and drying operations can be carried out even with relatively large or commercial quantities if care is taken to do so expeditiously. Ordinarily formation and drying should take place within a period of at most 24 hours and preferably within about 4 to 8 hours or less when this expedient is used. It is especially advantageous to use a pH of 7–8.5 in connection with this particular method.

The undesirable transformation can be avoided by other methods of preparation. For instance, the presence of acetate ion greatly delays the transformation even at ordinary temperautres. Also buffered precipitating solutions may be used. These expedients are the subject matter of applications Ser. No. 118,279, filed June 20, 1961, and Ser. No. 118,241, filed June 20, 1961, in the names of W. L. Kehl and M. M. Stewart.

The drying of the aluminum hydroxide may be carried out in any desired manner so long as it is completed prior to the harmful transformation. As may be gathered from the above described procedures for avoiding the transformation, a temperature of above 170° F. will prevent the transformation from taking place. Therefore it is advantageous to employ temperatures at least as high as this for drying. The drying may be carried out in vacuum if desired. It, of course, follows that considerably higher temperatures than 170° F. may be employed. For instance, it is entirely satisfactory to utilize temperatures such as 212° F., 400° F., or even higher. This drying removes the mechanically held water and yields a stable product. Thus this product, once dried, is stable even in the presence of water. It is predominantly composed of the desired aluminum hydroxide containing 1.2 to 2.6 mols of water of hydration.

After drying, the aluminum hydroxide is calcined to obtain an activated alumina which constitutes the carrier for the catalyst employed in our invention. Any conventional method heretofore used for calcining a dried alumina may be employed. However, a temperature above about 1600° F. should not be used since such elevated temperatures cause deactivation of the activated alumina. A temperature of between about 800° F. and 1200° F. ordinarily is satisfactory. A calcining time of between about 2 and 24 hours ordinarily will be satisfactory. In most cases the shorter time periods will be used with the higher temperatures and the longer periods with the lower temperatures. The final product is opaque, hard and glassy. It has a unique pore structure and is $Al_2O_3$ which still contains a small amount of water—usually less than about 3 percent.

For further details on the preparation of the carrier, reference is made to copending application Ser. No. 118,254, filed June 20, 1961, in the names of Flinn, Kehl, Schmid and Stewart.

The activated alumina carrier described above is composited with the hydrogenating components, comprising a mixture of nickel, nickel oxide, nickel sulfide, palladium and/or palladium sulfide with tungsten oxide or sulfide. Any of the conventional procedures for impregnation of porous carriers with multi-component catalyst may be used. Ordinarily we prefer to impregnate the activated alumina carrier with an aqueous solution of a salt of tungsten followed by drying and calcining and to then impregnate with an aqueous salt of nickel or palladium followed by a second drying and calcining. Other known procedures such as simultaneous impregnation of both metal components may be employed. See for instance U.S. Patent 2,703,789, McKinley and Pardee. In the event a sulfide is to be present, the catalyst is then treated with hydrogen sulfide to form the metal sulfides. This is advantageously carried out by treating with a mixture of hydrogen and hydrogen sulfide at a temperature between about 450° F. and 950° F. Alternatively the catalyst may be formed by precipitating the sulfides of the metals from aqueous impregnating solutions as by treatment with hydrogen sulfide. Between about 3% and 25% by weight of tungsten, .5 and 10% nickel and .1 and 2% palladium may be employed.

The presence of fluorine and/or silica in these catalysts in many cases has a beneficial effect. Therefore, our invention includes the presence of either or both of these materials. Fluorine and/or its compounds may be incorporated by treatment of the activated alumina carrier with a fluorine compound such as ammonium fluoride, hydrofluoric acid or fluosilicic acid. A preferred method of incorporating fluorine is to treat the alumina carrier prepared as described above with a mixture of ammonium fluoride and ammonia. The silica component may be incorporated by treatment with siliceous compounds such as tetraethylorthosilicate, sodium silicate or silicon tetrachloride. A preferred method is to employ the tetraethylorthosilicate. After treatment with one of these silicon compounds the alumina carrier is calcined to convert the compound into silica. In the event that sodium silicate is employed, it is necessary to thoroughly remove the sodium by water washing. Incorporation of between about 0.1% and 10% fluorine and between about 1% and 15% silica is advantageous in many cases.

The hydrocarbon to be hydrocracked is contacted with the above described catalyst in the presence of hydrogen under hydrocracking conditions. A temperature of between about 450° and 950° F. may be employed for this. A temperature of between about 600° F. and 800° F. is advantageous for a feed stock having a low nitrogen content. This low nitrogen feed will usually be prepared in a prehydrogenation stage in known fashion. A temperature of 700° F. to 850° F. is advantageous for a more impure feed containing a higher amount of nitrogen. This last mentioned higher temperature operation would not usually be preceded by any purification so that this operation usually would be a single-stage process. A hydrogen partial pressure of between about 200 and 5000 p.s.i. is ordinarily employed. Although higher pressures may be used, the high cost of producing such high pressures and the excessive cost of high pressure equipment offsets any advantages thereof. A pressure of between about 2000 and 5000 is advantageous when impure feeds high in nitrogen, i.e. above about 25 p.p.m., are treated. A hydrogen partial pressure of between about 500 and 2000 is advantageous for treatment of feeds which are low in nitrogen, i.e. below about 25 p.p.m. and preferably below about 10 p.p.m. In the above discussion of nitrogen content, it is of course intended to designate the nitrogenous impurities present in the feed which are known to have harmful effects on hydrocracking catalysts. A hydrogen recycle rate of between about 1000 and 20,000 s.c.f./bbl. of feed and preferably between about 2000 and 15,000 s.c.f./bbl. of feed is employed. A space velocity of between about 0.1 and 15 and preferably between about 0.5 and 5 is employed.

Our invention is applicable to the hydrocracking treatment of any hydrocarbon containing a substantial amount of hydrocarbon components boiling above 300° F. which is substantially free of asphaltic materials. Thus our invention is applicable to the hydrocracking of heavy naphthas to obtain high octane gasoline. Our invention is also applicable to the treatment of kerosene or furnace oil, gas oil, deasphalted residuum, whether straight run or cracked, and distillate shale oils. Also our invention is applicable to the hydrocracking of highly aromatic stocks such as solvent extracts or catalytically cracked cycle stocks.

The characteristics of the products obtained from the process of our invention will depend upon the feed stock, particularly the boiling point of the feed stock, and the reaction conditions employed. Thus, due to the high flexibility of the hydrocracking process, it is possible to prepare an improved jet fuel or an improved gasoline or reforming stock by treatment of middle oils. The amount of jet fuel versus gasoline formed can be controlled by selection of the reaction conditions, i.e. with a given feed and mild conditions, the product will predominate in higher boiling components in the jet fuel range. Alternatively by employing more severe conditions, particularly as regards temperature, a product is obtained which will predominate in hydrocarbons in the gasoline boiling range. This flexibility which is a characteristic of the hydrocracking process and which is well understood in the prior art is also a characteristic of our improved procedure.

As indicated above nitrogenous impurities which are frequently present in the feed stocks are known to have an undesirable effect on the hydrocracking process, particularly if carried out in the lower portions of the temperature ranges mentioned above. It is therefore advantageous to remove nitrogen impurities if a low temperature is to be employed in the hydrocracking operation.

The catalyst used in our process can be regenerated by combustion in the usual fashion and such regeneration will result in elimination of harmful compounds such as nitrogen compounds and the poisoning effect thereof. During regeneration of the catalyst a temperature of 800° to 1200° F. may be used.

EXAMPLE

An activated alumina carrier was prepared by dissolving 4730 parts by weight of $AlCl_3 \cdot 6H_2O$ in 20,000 parts by weight of water and adding 500 parts by weight of glacial acetic acid to form a first solution. A second solution was prepared by mixing 4000 parts by weight of concentrated $NH_4OH$ (28% $NH_3$) with 10,000 parts by weight of water. These solutions were mixed with rapid agitation. The pH of the resultant slurry was 8. The precipitate which resulted was separated by filtration, and the cake was washed with a 1% aqueous ammonium acetate solution and dried at 250° F. The time elapsing between addition of amomnia and completion of drying was 139 hours. This dried material was broken and sieved to recover the 10–20 mesh class. It contained approximately 1.7 mols of water of hydration. It was brought to a temperature of 1000° F. over a period of six hours and calcined for 10 hours at that temperature.

Samples of catalysts containing the metals shown in column 2, of Table I were prepared by impregnating samples of the activated alumina carrier prepared in the manner described above. In preparing these different catlysts, the alumina carrier was impregnated utilizing aqueous solutions of water soluble salts of the metal or metals in question. The incipient wetness technique was used for impregnation. The impregnated carrier was then dried at 250° F. and calcined at 1000° F.

The catalysts prepared in this manner were then used in the hydrocracking of a FCC Furnace Oil boiling from 400 to 620° F. which contained less than about one part per million nitrogen, about ten parts per million sulfur and having a gravity of 31° API. These hydrocracking tests were carried out at a temperature of 600° F., a pressure of 750 p.s.i.g., a space velocity (volume of charge per volume of catalyst per hour) of 1.0 and in the presence of hydrogen amounting to 10,000 s.c.f./bbl. of feed. In carrying out these test runs, the catalyst was heated to reaction temperature in the presence of circulating hydrogen at the temperature and pressure indicated for a period of about six hours before introduction of the FCC Furnace Oil feed stock. The results of these runs are shown in Table I.

Table I

| Conversion: Percent by vol., distilled at 400° F., ASTM | Catalyst metal composition, percent by weight |
|---|---|
| 80 | 5% Ni—16% W. |
| <20 | 11% Ni. |
| <20 | 16% W. |
| <20 | 5% Ni—16% Mo. |
| <20 | 5% Co—16% W. |
| <20 | 5% Co—16% Mo. |
| 45 | 1% Pd—16% W. |
| <20 | 1% Pd—11% Ni. |
| <20 | 1% Pd. |
| <20 | 1% Pt—16% W. |

From the data above, it will be noted that single metals such as nickel, tungsten or palladium and mixtures of metals comprising platinum and tungsten, palladium and nickel, nickel and molybdenum, cobalt and tungsten and cobalt and molybednum had relatively low hydrocracking activity. From the above data it will also be noted that catalysts containing both nickel and tungsten or both palladium and tungsten had superior hydrocracking activity.

We claim:
1. The process for hydrocracking a hydrocarbon feed stock which boils above about 300° F. and which is substantially free of asphaltic material to produce substantial amounts of lower boiling hydrocarbons, which process comprises contacting the hydrocarbon feed stock with hydrogen under hydrocracking reaction conditions in the presence of a catalyst comprising essentialy a member of the group consisting of tungsten oxide and sulfide mixed with a member of the group consisting of nickel, nickel oxide, nickel sulfide, palladium and palladium sulfide, which catalyst is composited with a major amount of an activated alumina prepared by calcining a substance which is predominantly composed of an aluminum hydroxide containing from 1.2 to 2.6 mols of water of hydration, said aluminum hydroxide being prepared by precipitation from a solution of an aluminum salt at a pH between 7 and 12, and drying to the above mentioned water of hydration content prior to substantial transformation to an aluminum hydroxide having a lower or higher water of hydration content and under conditions so as to prevent the formation of an aluminum hydroxide having a lower or higher water of hydration content.

2. The process for hydrocracking a hydrocarbon feed stock which boils above about 300° F. and which is substantially free of asphaltic material to produce substantial amounts of lower boiling hydrocarbons, which process comprises contacting the hydrocarbon feed stock with hydrogen under hydrocracking reaction conditions in the presence of a catalyst comprising essentially a member of the group consisting of tungsten oxide and sulfide mixed with a member of the group consisting of nickel, nickel, oxide, nickel sulfide, palladium and palladium sulfide, which catalyst is composited with a major amount of an activated alumina prepared by calcining a substance which is predominantly composed of an aluminum hydroxide containing from 1.2 to 2.6 mols of water of hydration, said aluminum hydroxide being prepared by precipitation from a solution of an aluminum salt at a pH between 7 and 8.5, and drying to the above mentioned water of hydration content prior to substantial transformation to an aluminum hydroxide having a lower or higher water of hydration content and under conditions so as to prevent the formation of an aluminum hydroxide having a lower or higher water of hydration content.

3. The process for hydrocracking a hydrocarbon feed stock which boils above about 300° F. and which is substantially free of asphaltic material to produce substantial amounts of lower boiling hydrocarbons, which process comprises contacting the hydrocarbon feed stock with hydrogen under hydrocracking reaction conditions in the presence of a catalyst comprising essentially a member of the group consisting of tungsten oxide and sulfide mixed with a member of the group consisting of nickel, nickel oxide, nickel sulfide, palladium and palladium sulfide, which catalyst is composited with a minor amount of silica and with a major amount of an activated alumina prepared by calcining a substance which is predominantly composed of an aluminum hydroxide containing from 1.2 to 2.6 mols of water of hydration, said aluminum hydroxide being prepared by precipitation from a solution of an aluminum salt at a pH between 7 and 12, and drying to the above mentioned water of hydration content prior to substantial transformation to an aluminum hydroxide having a lower or higher water of hydration content and under conditions so as to prevent the formation of an aluminum hydroxide having a lower or higher water of hydration content.

4. The process for hydrocracking a furnace oil which is substantially free of asphaltic material to produce substantial amounts of gasoline, which process comprises contacting the furnace oil with hydrogen under hydrocracking reaction conditions in the presence of a catalyst comprising essentially a member of the group consisting of tungsten oxide and sulfide mixed with a member of the group consisting of nickel, nickel oxide, nickel sulfide, which catalyst is composited with a major amount of an activated alumina prepared by calcining a substance which is predominantly composed of an aluminum hydroxide containing from 1.2 to 2.6 mols of water of hydration, said aluminum hydroxide being prepared by precipitation from a solution of an aluminum salt at a pH between 7 and 8.5, and drying to the above mentioned water of hydration content prior to substantial transformation to an aluminum hydroxide having a lower or higher water of hydration content and under conditions so as to prevent the formation of an aluminum hydroxide having a lower or higher water of hydration content.

5. The process for hydrocracking a hydrocarbon feed stock which boils above about 300° F. and which is substantially free of asphaltic material to produce substantial amounts of lower boiling hydrocarbons, which process comprises contacting the hydrocarbon feed stock with hydrogen under hydrocracking reaction conditions in the presence of a catalyst comprising essentially a member of the group consisting of tungsten oxide and sulfide mixed with a member of the group consisting of nickel, nickel oxide, nickel sulfide, palladium and palladium sulfide, 0.1 to 10 percent fluorine and an activated alumina prepared by calcining a substance which is predominantly composed of an aluminum hydroxide containing from 1.2 to 2.6 mols of water of hydration, said aluminum hydroxide being prepared by precipitation from a solution of an aluminum salt at a pH between 7 and 8.5, and drying to the above mentioned water of hydration content prior to substantial transformation to an aluminum hydroxide having a lower or higher water of hydration content and under conditions so as to prevent the formation of an aluminum hydroxide having a lower or higher water of hydration content.

6. The process for hydrocracking a hydrocarbon feed stock which boils above about 300° F. and which is substantially free of asphaltic material to produce substantial amounts of lower boiling hydrocarbons, which process comprises contacting the hydrocarbon feed stock with hydrogen under hydrocracking reaction conditions in the presence of a catalyst comprising essentially a member of the group consisting of tungsten oxide and sulfide mixed with a member of the group consisting of nickel, nickel oxide, nickel sulfide, 1.0 to 15 percent palladium and palladium sulfide, silica and an activated alumina prepared by calcining a substance which is predominantly composed of an aluminum hydroxide containing from 1.2 to 2.6 mols of water of hydration, said aluminum hydroxide being prepared by precipitation from a solution of an aluminum salt at a pH between 7 and 12, and drying to the above mentioned water of hydration content prior to substantial transformation to an aluminum hydroxide having a lower or higher water of hydration content and under conditions so as to prevent the formation of an aluminum hydroxide having a lower or higher water of hydration content.

7. The process for hydrocracking a hydrocarbon feed stock which boils above about 300° F. and which is substantially free of asphaltic material to produce substantial amounts of lower boiling hydrocarbons, which process comprises contacting the hydrocarbon feed stock with hydrogen under hydrocracking reaction conditions in the presence of a catalyst comprising essentially a member of the group consisting of tungsten oxide and sulfide mixed with a member of the group consisting of nickel, nickel oxide, nickel sulfide, palladium and palladium sulfide, which catalyst is composited with a major amount of an activated alumina prepared by calcining a substance which is predominantly composed of an aluminum hydroxide containing from 1.2 to 2.6 mols of water of hydration, said aluminum hydroxide being prepared by precipitation from a solution of an aluminum salt at a pH between 7 and 12 and in the presence of acetate ion, and drying to the above mentioned water of hydration content prior to substantial transformation to an aluminum hydroxide having a lower or higher water of hydration content and under conditions so as to prevent the formation of an aluminum hydroxide having a lower or higher water of hydration content.

8. The process of claim 7 wherein the precipitation from a solution of an aluminum salt is at a pH between 7 and 8.5.

References Cited by the Examiner
UNITED STATES PATENTS

| | | | |
|---|---|---|---|
| 2,709,151 | 5/55 | Nonnenmacher | 208—112 |
| 2,894,898 | 7/59 | Oettinger et al. | 208—112 |
| 3,043,769 | 7/62 | Nathan et al. | 208—112 |

OTHER REFERENCES

Kirk-Othmer: Encyclopedia of Chemical Technology, second edition, vol. 2, Interscience Publishers, New York (1963), page 43.

ALPHONSO D. SULLIVAN, *Primary Examiner.*